Patented Mar. 30, 1954

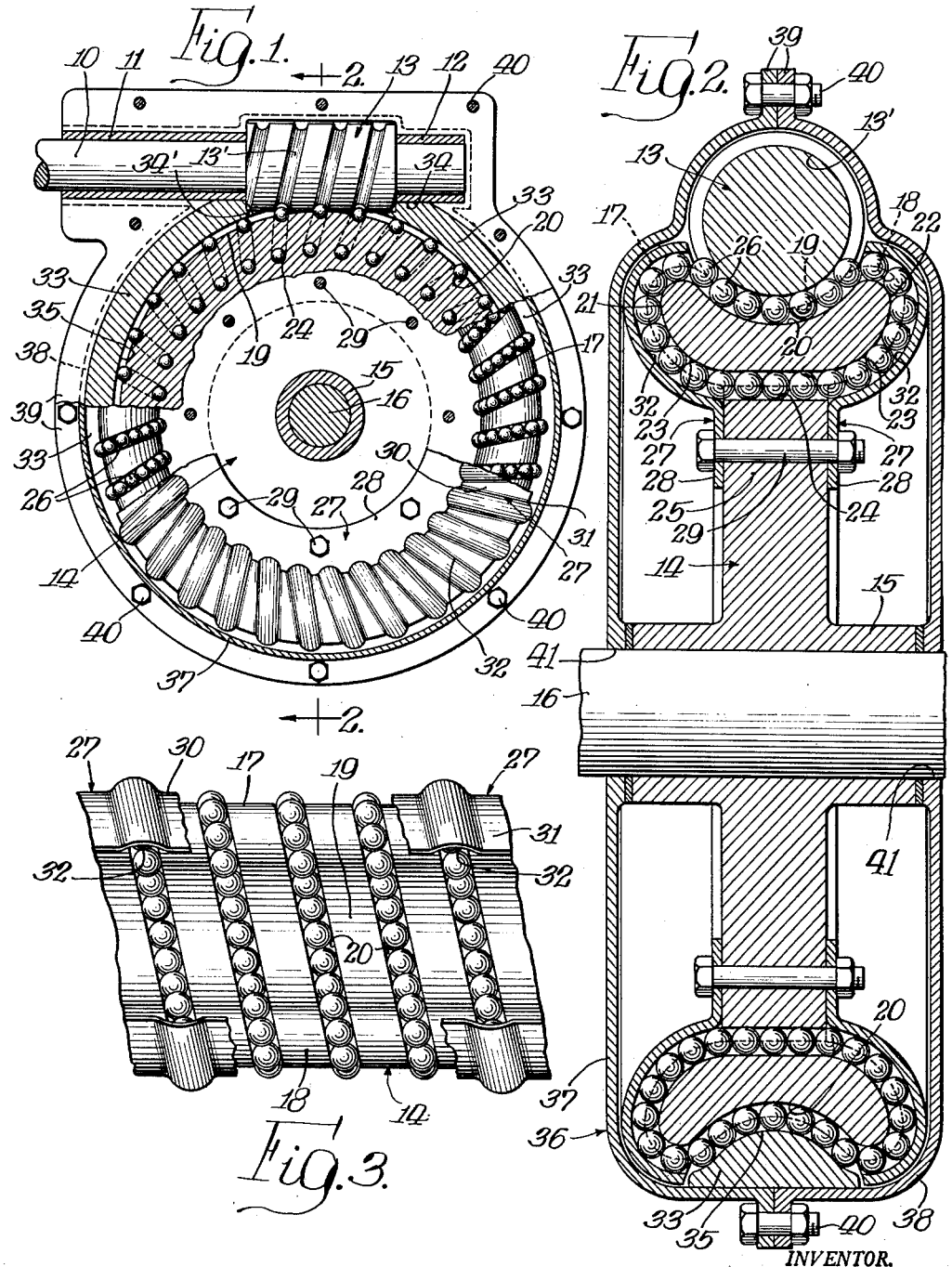

2,673,473

UNITED STATES PATENT OFFICE 2,673,473

ANTIFRICTION WORM GEARING MECHANISM

Alva W. Phelps, Kenilworth, Ill., assignor to The Oliver Corporation, a corporation of Delaware Application July 20, 1950, Serial No. 174,990

7 Claims. (Cl. 74—458)

The present invention relates generally to an anti-friction worm gearing mechanism, but more particularly to that type of worm drive which is especially adapted for incorporation into automotive steering gears.

One of the primary objects of the present invention is to provide a novel, simple and improved construction of a worm gearing mechanism which will operate with a minimum amount of friction.

A further object of the invention is to provide a novel anti-friction worm and worm gear mechanism in which anti-friction bearing balls carried by the gear performs a two-fold function of forming the torque transmitting means between the worm and worm gear and also serving as the anti-friction means for rotatably supporting the gear within its housing.

Another object of the invention is to provide a novel and improved anti-friction worm gearing mechanism in which a plurality of sets of anti-friction bearing balls are supported and retained in raceways formed in the gear wheel or sector and arranged for operative engagement with the worm.

A further object of the invention is to provide an anti-friction steering gear mechanism with a minimum number of parts, many of which are metal stampings, so that they may be easily and accurately assembled.

These and other objects are accomplished by providing a construction and an arrangement of the various parts in the manner hereinafter described and particularly pointed out in the appended claims.

Referring to the drawings:

Fig. 1 is a side elevational view partly in cross section with certain portions broken away showing one embodiment of my invention;

Fig. 2 is an enlarged cross-sectional view taken on the lines 2—2 in Fig. 1; and Fig. 3 is an enlarged fragmentary view showing a portion of the worm wheel.

In illustrating one form my invention may assume in practice, I have shown the same as comprising a worm shaft 10 which is suitably journaled in spaced apart bearing bushings 11 and 12. Secured to the shaft 10 or formed integrally therewith is a worm, generally indicated by the reference character 13, which is of relatively larger diameter than the shaft proper. Extending around the periphery of the worm 13 is a spirally arranged groove 13' which forms the raceway for the anti-friction balls hereinafter described. Operatively related or driven by the worm 13 is a worm wheel or gear, generally indicated by the reference character 14. The gear in this instance, of course, may be a steering gear sector where, for example, oscillation or angular movement of the steering sector would require no more than an arc of 150° for steering purposes. The worm gear or wheel 14 is provided with a hub 15 which may be splined or otherwise secured to a shaft 16. The outer or peripheral portion of the gear 14 flares out laterally as shown at 17 and 18 and its peripheral surface is concaved or circular in cross-section as shown at 19 so as to lie concentrically to the circular surface of the worm as clearly shown in the vertical cross-sectional view of Fig. 2 of the drawings. Extending across the curved peripheral surface 19 of the worm gear 14 and complementary to the spiral grooves 13' of the worm 13 are uniformly spaced apart and angularly pitched ball bearing grooves 20. The laterally extending portions 17 and 18 of the worm gear 14 are provided with arcuate grooves or ball races 21 and 22 respectively which form continuations in opposite directions of each of the ball raceways 20 formed in the periphery of the worm gear. The curved raceways 21 and 22 extend inwardly, as shown at 23, and communicate directly with a transverse raceway or aperture 24 formed in the relatively narrow portion 25 of the gear wheel 14. From the above description it will be seen that the anti-friction balls 26 mounted in these raceways have a complete path of travel in the operation or rotation of the worm 13 in driving the worm wheel or gear 14. The anti-friction balls 26 are retained in the opposite raceways 21 and 22 and by oppositely disposed metal stampings or plates generally indicated by the reference character 27. The plates 27 have internal flanges 28 which are secured to the opposite sides of the narrow portion 25 of the gear wheel 14 by means of bolts 29. The outer portions of these plates are arcuately curved outwardly, as shown at 30, and then inwardly, as shown at 31, to conform with the curvature of the outwardly or laterally curved portions 17 and 18 of the worm wheel 14. At uniformly spaced intervals in the outwardly depressed grooves 32 which form complementary raceways in alignment with the respective raceways 21 and 22 of the worm wheel 14 so as to retain the balls in their respective raceways. The anti-friction balls 26 are retained in the respective raceways 20 at points beyond the worm 13 by two substantially semi-circular retainer members, generally indicated by the reference character 33. The upper portions of each of these semi-circular retainers are flat, as shown at 34, so as to contact the opposite bearing sleeves 11 and 12 of the worm wheel 13. The upper portions of the retainer members 33 have inwardly pointed ends 34' for retaining the balls 26 in their respective raceways at points adjacent the worm 13. The inner surface of these semi-circular rings 33 are arcuately curved in cross-section as shown at 35. (See Fig. 2 of the drawings.) The curved portions 35 of each of the semi-circular members 33 are concentrically arranged with respect to the peripheral curved surface 19 of the gear wheel 14 so as to retain the anti-friction balls 26 in their respective grooves or raceways 20 in said gear. The retainer ring sections 33 are supported and retained in proper position by an encasing or housing, generally indicated by the reference character 36. This casing or housing is preferably made of two sheet metal stampings or sections 37 and 38 so as to completely embrace the worm 13 and worm wheel 14 and support and retain the bearing sleeves 11 and 12 in position. The sections 33 are provided with lateral peripheral flanges 39 which are secured together by bolts 40.

The opposite casing members 37 and 38 are provided with aligned openings through which the shaft 16 may extend. In this connection it will be noted that the openings 41 in the housing 36 may be relatively larger than the shaft 16 so as to loosely receive the shaft in which case the anti-friction balls carried by the gear and engaging the retainer ring sections 33 forms the anti-friction support for the gear 14 within the housing 36. It will thus be seen that the anti-friction balls 26 carried by the gear 14 performs a two-fold function, i. e. first of transmitting the torque or drive from the worm to the worm gear and, second, of forming the anti-friction bearing support for the gear in its encasing housing.

Summarizing the advantages and function of operation of my improved worm gearing mechanism, it will be seen that by arranging the anti-friction balls in separate raceways throughout the periphery of the worm wheel, the anti-friction balls become the sole means of transmitting the torque or drive from the worm to the worm wheel and at the same time forms the anti-friction bearing support for the gear within its housing to thereby eliminate or reduce to a minimum the friction between these two operating parts and their supporting structure. It will also, be observed that the retaining plates and the enclosing housing sections may be made of metal stampings so that they may be easily and readily secured together to reduce the time of assembly to a minimum.

While in the above specification I have described one embodiment which my invention may assume in practice, it will of course be understood that the same is capable of modification and that modification may be made without departing from the spirit and scope of the invention as expressed in the following claims.

What I claim as my invention and desire to secure by Letters Patent is:

1. An anti-friction gearing mechanism comprising a worm having spirally arranged grooves in the periphery thereof, a worm gear having its periphery transversely curved and concentric to the curvature of the periphery of said worm, spaced apart ball raceways extending transversely in the curved periphery of said worm gear, communicating raceways encircling the outer portions of said gear, anti-friction balls mounted in said raceways adapted to engage the grooved portions of said worm, oppositely disposed plates carried by said gear for retaining the balls in certain portions of said raceways, retainer members substantially encircling said gear for retaining the balls in the major peripheral portion of said gear forming a bearing for said gear, and a housing encasing said worm and worm gear and engaging and supporting said retainer members in position.

2. An anti-friction gearing mechanism comprising a gear having ball races transversely arranged in its periphery, anti-friction balls mounted in said races, a worm positioned adjacent said gear and adapted to engage said balls for driving said gear, a housing encasing said worm and gear, and retainer members carried by said housing and engaging said balls for forming an anti-friction bearing for said gear.

3. An anti-friction gearing mechanism comprising a gear having ball races transversely arranged in its periphery, anti-friction balls mounted in said races, a worm positioned adjacent said gear and adapted to engage said balls for driving said gear, a housing comprising two complementary sections secured together for encasing the worm and gear, and two substantially semi-circular ball retaining members secured to said housing and engaging said balls for forming an anti-friction bearing for said gear.

4. An anti-friction gearing mechanism comprising a worm having spirally arranged grooves in the periphery thereof, a worm gear having its periphery transversely curved and concentric to the curvature of the periphery of said worm, spaced apart ball raceways extending transversely in the curved periphery of said worm gear, communicating raceways encircling the outer portions of said gear, anti-friction balls mounted in said raceways adapted to engage the grooved portions of said worm, oppositely disposed plates carried by said gear for retaining the balls in certain portions of said raceways, and a support for said gear engageable with said balls for forming an anti-friction bearing for said gear.

5. An anti-friction gearing mechanism comprising a worm having spirally arranged grooves in the periphery thereof, a worm gear having its periphery transversely curved and concentric to the curvature of the periphery of said worm, spaced apart ball raceways extending transversely in the curved periphery of said worm gear, communicating raceways encircling the outer portions of said gear, anti-friction balls mounted in said raceways adapted to engage the grooved portions of said worm, oppositely disposed plates carried by said gear for retaining the balls in certain portions of said raceways, and a housing substantially encircling said gear for retaining said balls on said gear and forming an anti-friction bearing for said gear.

6. An anti-friction gearing mechanism comprising a worm having spirally arranged grooves in the periphery thereof, a worm gear having its periphery transversely curved and concentric to the curvature of the periphery of said worm, spaced apart ball raceways extending transversely in the curved periphery of said worm gear, communicating raceways encircling the outer portions of said gear, anti-friction balls mounted in said raceways adapted to engage the grooved portions of said worm, oppositely disposed plates carried by said gear for retaining the balls in certain portions of said raceways, a housing encasing said worm and gear, and retainer members carried by said housing and engaging said balls for forming an anti-friction bearing for said gear.

7. An anti-friction gearing mechanism comprising a worm having spirally arranged grooves in the periphery thereof, a worm gear having its periphery transversely curved and concentric to the curvature of the periphery of said worm, spaced apart ball raceways extending transversely in the curved periphery of said worm gear, communicating raceways encircling the outer portions of said gear, anti-friction balls mounted in said raceways adapted to engage the grooved portions of said worm, oppositely disposed plates carried by said gear for retaining the balls in certain portions of said raceways, a housing comprising two complementary sections secured together for encasing the worm and gear, and two substantially semi-circular ball retainer members secured to said housing and engaging said balls for forming an anti-friction bearing for said gear.

ALVA W. PHELPS.

References Cited in the file of this patent

UNITED STATES PATENTS

| Number | Name | Date |
| --- | --- | --- |
| 855,937 | Collier | June 4, 1907 |
| 1,781,083 | Schmick | Nov. 11, 1930 |
| 2,408,666 | Mallard | Oct. 1, 1946 |

FOREIGN PATENTS

| Number | Country | Date |
| --- | --- | --- |
| 769,129 | France | Oct. 20, 1934 |